(12) United States Patent
Franchini et al.

(10) Patent No.: US 8,535,561 B2
(45) Date of Patent: Sep. 17, 2013

(54) TAIL SEALS

(75) Inventors: Jacopo Franchini, Arese (IT); Luigi Merli, Saronno (IT); Nicola Zangarini, Morazzone (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 343 days.

(21) Appl. No.: 12/867,373

(22) PCT Filed: Feb. 9, 2009

(86) PCT No.: PCT/EP2009/051422
§ 371 (c)(1),
(2), (4) Date: Aug. 12, 2010

(87) PCT Pub. No.: WO2009/101038
PCT Pub. Date: Aug. 20, 2009

(65) Prior Publication Data
US 2011/0008107 A1    Jan. 13, 2011

(30) Foreign Application Priority Data
Feb. 13, 2008    (IT) .............................. VA2008A0009

(51) Int. Cl.
*C09K 3/00*    (2006.01)

(52) U.S. Cl.
USPC .......................................... 252/194; 405/138

(58) Field of Classification Search
USPC ........................................................ 252/194
See application file for complete search history.

(56) References Cited

U.S. PATENT DOCUMENTS

2006/0149085 A1* 7/2006 Bloom .............................. 554/1
2007/0151480 A1* 7/2007 Bloom et al. ................. 106/220

* cited by examiner

*Primary Examiner* — Melvin C Mayes
*Assistant Examiner* — Melissa Stalder
(74) *Attorney, Agent, or Firm* — Mossman, Kumar & Tyler, PC

(57) ABSTRACT

Tail seal compound (tail seal) for tunnelling machine comprising blown oils, more than 30% by weight of a mineral charge and fibrous material.

17 Claims, 1 Drawing Sheet

TAIL SEALS

TECHNICAL FIELD

The present invention concerns a tail seal compound (tail seal) for tunnelling machines, i.e. a sealing composition that is used to avoid the penetration of ground water and grout, injected behind the precast concrete segments inside mechanical tunnel boring machines during excavation.

The sealing composition of the present invention comprises blown oils, more than 30% by weight of a mineral charge and fibrous material.

BACKGROUND ART

Sealing compositions are pumped to fill the gap occurring between tail brushes on the inside of the shield, to seal them and avoid ground water, grout or contaminants in general to enter.

They shall have excellent resistance against:
water wash-out
mechanical wear and pressure
flowing-off/extrusion
At the same time they have to show important features as:
strong adhesive properties
high stability without fluid separation
low toxicity and environmental compatibility To further enhance their environmental compatibility, it is also highly desirable to have hydrocarbon free sealing compositions.

Known tail seals are usually made of a hydrophobic portion, a mineral charge, fibrous material and various additives and are in the form of sticky pastes.

Their maximum consistency is limited by the capacity of the pumping devices, that usually work by pressing out the mixture from its container.

The hydrophobic portion is responsible for adhesion to the metallic surface, for insulation from water leakage and its chemical structure strongly influences the rheology of the sealant.

To adequately perform its role, the hydrophobic portion normally represents at least 30% of the sealing composition.

The mineral charge is used as filler, its maximum concentration being limited by the maximum final viscosity and consistency of the composition.

The fibrous materials are usually added in small percentages (1 to 10% by weight) to improve the pastiness and lubricating characteristics of the sealing composition.

Additives can be chosen among emulsifiers, gelling agents, viscosifiers, preservatives, corrosion inhibitors added alone or in combination.

Among the patents concerning specific compositions useful as tail seals we cite:

U.S. Pat. No. 5,478,385, describing sealing compositions comprising a hydrophobic portion, a lipophilic emulsifier and at least 20% water, in sufficient concentration to inhibit combustion of the composition;

FR 2 807 058, concerning a water reactive emergency sealing composition comprising a gelling or thickening agent;

JP 09-208943, describing seal tails that contain a synthetic pour point depressant, up to 60 wt % mineral charge and a biodegradable oil or grease or mixture thereof; in this publication, blown oil are not mentioned among the utilizable oils and greases and, although mineral charges like inorganic carbonate or sulfate are cited, in the examples desirable high levels of mineral charge are only obtained by using inorganic materials in the form of paste or talc (normally talc is commercially available with relatively small mean particle size, between 1.5 and 37 microns and possesses lubricant properties).

DISCLOSURE OF THE INVENTION

It has now been found that when blown oils are used as the hydrophobic portion of the sealant, the mineral charge can represent more than 30%, advantageously more than 45%, and up to 70% by weight of the total tail seal composition, without the need of pouring point depressants or emulsifying agents and without the need of using talc as the mineral charge. In one embodiment, the tail seal composition is prepared in the substantial absence of talc. In another embodiment, the tail seal composition is prepared in the substantial absence of talc, pouring point depressants, and emulsifying agents. In still another embodiment, the tail seal composition is prepared in the substantial absence of talc, point depressants, and emulsifying agents.

The result is an eco-compatible sealing composition that advantageously can be based on oxidized oils.

It is therefore a fundamental object of the present invention a tail seal comprising from 30 to 70% by weight of blown oils, from 30 to 70% by weight, preferably from 45 to 70% by weight, of mineral charge and from 2 to 10% by weight of a fibrous material.

Blown oils are produced at elevated temperatures (60-250° C.), by blowing air through unsaturated oils; the oils polymerize by crosslinking through formation of peroxide bridges and C-C linkages.

Blown oils are also known as oxidized, thickened or oxidatively polymerized oils.

They can be produced from a wide range of animal or vegetable oils, for example from rape seed oil, castor oil, linseed oil, olive oil, soybean oil, palm oil, tall oil, fish oil, menhaden oil, herring oil, sardine oil, cod oil, liver oil, and mixture thereof.

Another convenient source of oils to be blown is the recovery of used oils.

Blown oils are generally manufactured to viscosity specifications.

For the realization of the present invention only blown oils having Brookfield® viscosity RVT at 25° C., 20 rpm higher than 4,000 mPa·s can be used, preferably higher than 6,000 mPa·s, more preferably of at least 8,000 mPa·s.

According to a preferred embodiment of the invention the blown oils are blown used oils, obtained by air oxidation of waste oils and fats.

Preferably, the acidity number of the blown oils should not exceed 110 mg KOH/g.

The preferred amount of blown oils in the tail seals of the invention ranges from 40 to 50% by weight.

The mineral charge utilizable is a non fibrous mineral charge in the form of powder.

Utilizable mineral charges are salts of multivalent cations, of natural or synthetic origin in the form of hydroxides, carbonates, sulphates, etc.

Preferred mineral charges are calcium carbonate, hydrated calcium sulphate, barium sulphate, the most preferred mineral charge being calcium carbonate.

The particle size of the mineral charge is not critical: for economical reasons it is therefore preferred to use mineral charges having mean particle size between 40 and 300 microns.

Cellulose fibres, preferably long length cellulose fibres, can advantageously be used as the fibrous material; also other non toxic fibrous materials having 1-5 mm length and 0.5-2 din fineness can be used.

The tail seals of the present invention can be prepared by mixing at room temperature its ingredients; preferably the mineral charge is first mixed with the blown oil, the fibrous material is added and mixing is continued until visual homogeneity is reached.

The sealant performances are not influenced by the operating temperature currently encountered by tunnel boring machine heads and generally in a range between 0 and 90° C.

EXAMPLES

Example 1

Figure 1:
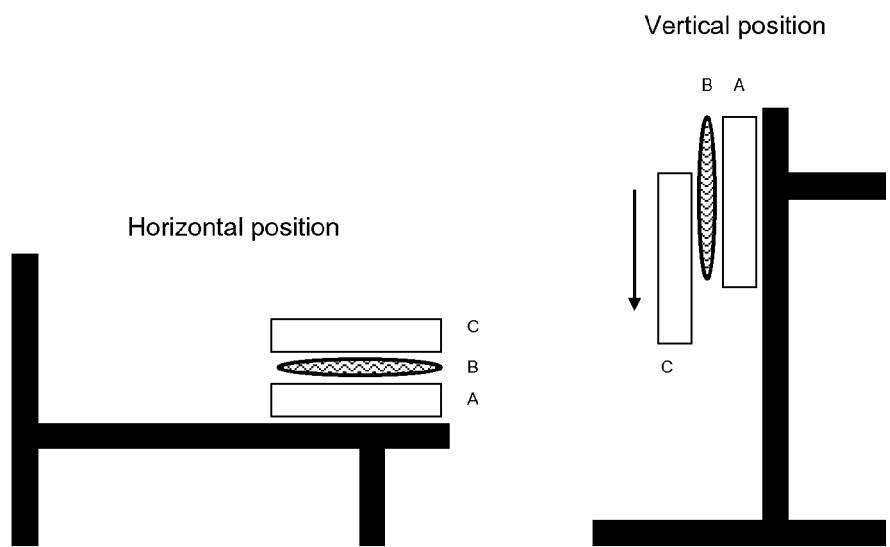
FIG. 1 represents the scheme of the equipment which is used to perform the slump test (see details in the Performance Testing section—Method 1).
Figure 2:
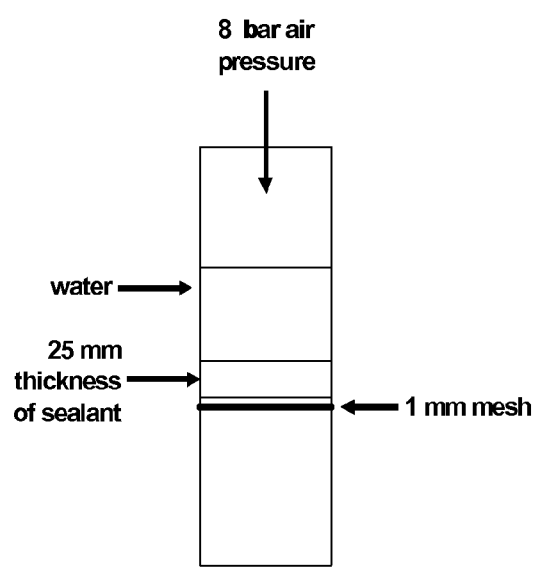
FIG. 2 represents the scheme of the equipment which is used to perform the water pressure test (see details in the Performance Testing section—Method 2).

A tail seal is prepared having the following percentage composition by mass:
46% blown castor oil, with Brookfield® viscosity RVT at 25° C., 20 rpm=4,600 mPa·s
51% $CaCO_3$
3% cellulose fibre
Preparation procedure:
Blown oil and $CaCO_3$ are mixed together at 25° C. to obtain an uniform, high viscosity but flowing liquid. At this point, fibres are slowly added to the mixture and mixed together to obtain a sticky, not flowing paste.

Example 2

Another tail seal is prepared having the following percentage composition by mass:
46% blown castor oil with Brookfield® viscosity RVT at 25° C., 20 rpm=8,000 mPa·s
50% $CaCO_3$
3% long cellulose fibre
1% short cellulose fibre
Preparation procedure is the same as in Example 1.

Example 3

Another tail seal is prepared having the following percentage composition by mass:
45% blown vegetable oil with Brookfield® viscosity RVT at 25° C., 20 rpm
8,600 mPa·s
50% $CaCO_3$
5% cellulose fibre
Preparation procedure is the same as in Example 1.

PERFORMANCE TESTING

Method 1. Slump Test

Scope: the simple test characterizes the adhesion and slump of a tail seal, when it is in contact with metallic surfaces.

Method

Place the steel plate <<A>> horizontally. Spread the tail seal <<B>> on the steel plate to obtain an homogeneous layer of about 2-3 mm of thickness. Then place the upper steel plate <<C>> on the seal teal layer and put a load of 2 kg on top for 2 minutes. Take off the load and raise the support into a vertical position starting chronometer. Monitor the vertical movement of the 'upper plate' <<C>> and measure the time necessary to complete detachment of the plate. Sample temperature shall be 20 to 25° C. (unless differently requested). The plates have dimension of 100×100×10 mm and their weight is approx. 800 g.

Analysis of the Results

A detachment time of 40 seconds is considered the lowest acceptable limit; detachment times higher than 70 seconds are considered very good.

| Sample | Time to complete detachment of plate in seconds |
|---|---|
| Example 1 | 43 |
| Example 2 | 77 |
| Example 3 | 80 |

Method 2. Water Pressure Test

Scope: the resistance of the tail seal to water pressure is measured forcing the product through a 1 mm mesh and measuring the amount of water or substance released.

Method

The test is run with a fluid loss measure cell, that is a metal cylinder with a mesh at the bottom and an air inlet on the top. A 25 mm thick layer of tail seal is spread over the mesh. The part of the cell above the sealant is filled with water and an air pressure of 8 bar is applied. The amount of water released after 30 minutes under air pressure is measured.

Analysis of the Results.

An amount of released water of 10 ml is the highest acceptable limit; amounts of released water equal or lower than 3 ml are considered very good.

The amounts of released water are reported in table 2.

TABLE 2

| Sample | Amount of water released (ml) |
|---|---|
| Example 1 | 10 |
| Example 2 | 3 |
| Example 3 | 0 |

The invention claimed is:

1. A composition useful for preparing tail seals comprising: from about 30 to about 70% by weight of blown oils having Brookfield® viscosity RVT at 25° C., 20 rpm, higher than about 4,000 mPa·s,
from about 30 to about 70% by weight of a mineral charge, and
from about 2 to about 10% by weight of fibrous material;
wherein the mineral charge is a non fibrous mineral charge in the form of powder; and
the powder has a mean particle size of from about 40 to about 300 microns;
and wherein the composition is prepared in the substantial absence of talc.

2. The composition of claim 1 wherein the mineral charge is from about 45 to about 70% by weight of the composition.

3. The composition of claim 1 wherein the blown oils have Brookfield® viscosity RVT at 25° C., 20 rpm, higher than about 6,000 mPa·s.

4. The composition of claim 3 wherein the blown oils have Brookfield® viscosity RVT at 25° C., 20 rpm, of at least about 8,000 mPa·s.

5. The composition of claim 1 wherein the blown oils have an acid number of less than or equal to about 110 mg KOH/g.

6. The composition of claim 1 wherein the blown oils are produced using an oil selected from the group consisting of: rape seed oil, castor oil, linseed oil, olive oil, soybean oil, palm oil, tall oil, fish oil, menhaden oil, herring oil, sardine oil, cod oil, liver oil, used oils and fats, and mixtures thereof.

7. The composition of claim 6 wherein the blown oils are produced using castor oil.

8. The composition of claim 6 wherein the blown oils are produced using used oil.

9. The composition of claim 5 comprising from about 40 to about 50% by weight of blown oils.

10. The composition of claim 6 wherein the blown oils are produced at elevated temperatures of from about 60 to about 250° C. by blowing air through the oil.

11. The composition of claim 6 wherein the blown oils are produced by crosslinking the oil through formation of peroxide bridges and C-C linkages.

12. The composition of claim 6 wherein the mineral charge is selected from the group consisting of calcium carbonate, hydrated calcium sulphate, barium sulphate and mixtures thereof.

13. The composition of claim 12 wherein the mineral charge is calcium carbonate.

14. The composition of claim 1 wherein the fibrous material consists of cellulose fibers.

15. The composition of claim 14 wherein the cellulose fibers have a length of from about 1 mm to about 5 mm.

16. A method of excavating or tunneling comprising using a tail sealing compound to prevent the penetration of the tunnel or excavation wall by ground water wherein the tail sealing compound comprises:
from about 30 to about 70% by weight of blown oils having Brookfield® viscosity RVT at 25° C., 20 rpm, higher than about 4,000 mPa·s,
from about 30 to about 70% by weight of a mineral charge, and
from about 2 to about 10% by weight of fibrous material; and
wherein the tail sealing compound is prepared in the substantial absence of talc.

17. A composition useful for preparing tail seals comprising:
from about 30 to about 70% by weight of blown oils having Brookfield® viscosity RVT at 25° C., 20 rpm, higher than about 4,000 mPa·s,
from about 30 to about 70% by weight of a mineral charge, and
from about 2 to about 10% by weight of fibrous material;
wherein the composition is prepared in the substantial absence of talc, pour point depressants and emulsifying agents.

* * * * *